US008713501B1

(12) United States Patent
Le et al.

(10) Patent No.: US 8,713,501 B1
(45) Date of Patent: Apr. 29, 2014

(54) DUAL-BOX LOCATION AWARE AND DUAL-BITMAP VOLTAGE DOMAIN AWARE ON-CHIP VARIATION TECHNIQUES

(71) Applicant: Synopsys, Inc., Mountain View, CA (US)

(72) Inventors: Jiayong Le, Sunnyvale, CA (US); Feroze P. Taraporevala, Los Altos, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/708,902

(22) Filed: Dec. 7, 2012

(51) Int. Cl.
*G06F 17/50* (2006.01)
(52) U.S. Cl.
CPC ........ *G06F 17/5081* (2013.01); *G06F 17/5031* (2013.01)
USPC ............................................. 716/113; 716/134

(58) Field of Classification Search
None
See application file for complete search history.

(56) References Cited

U.S. PATENT DOCUMENTS

| 7,234,125 B1* | 6/2007 | Scott et al. .................... 716/102 |
| 7,237,212 B2 | 6/2007 | Kucukcakar et al. |
| 2013/0239079 A1* | 9/2013 | Tetelbaum .................... 716/113 |

OTHER PUBLICATIONS

Kobayashi et al., "An LOCV-based Static Timing Analysis Considering Spatial Correlations of Power Supply Variation," 2011 EDAA, 4 pages.*
Mutlu et al., "A Parametric Approach for Handling Local Variation Effects in Timing Analysis," 2009 ACM-DAC, pp. 126-129.*
Li et al. , "Defining Statistical Timing Sensitivity for Logic Circuits With Large-Scale Process and Environmental Variations," IEEETrans. on CAD of ICs & Systems, vol. 27, No. 6, Jun. 2008, pafes 1041-1054.*
Weber, "My Head Hurts, My Timing Stinks, and I Don't Love On-Chip Variation," SNUGNoston 2002, pp. 1-21.*

* cited by examiner

*Primary Examiner* — Leigh Garbowski
(74) *Attorney, Agent, or Firm* — Bever, Hoffman & Harms, LLP; Jeanette S. Harms

(57) ABSTRACT

A dual-box location-based on-chip variation (DBLOCV) can be used in STA to significantly reduce pessimism. The DBLOCV analysis includes forming a backward bounding box and a forward bounding box for a cell of the design. A first intermediate maximum distance from the cell to corners of the backward bounding box can be calculated using the coordinates. A second intermediate maximum distance from the cell to corners of the forward bounding box can be calculated using the coordinates. A derate value can be determined from the derate table using the maximum distance of the first and second intermediate maximum distances. STA can be performed using the derate value. At least one timing report can be generated based on the STA.

23 Claims, 15 Drawing Sheets

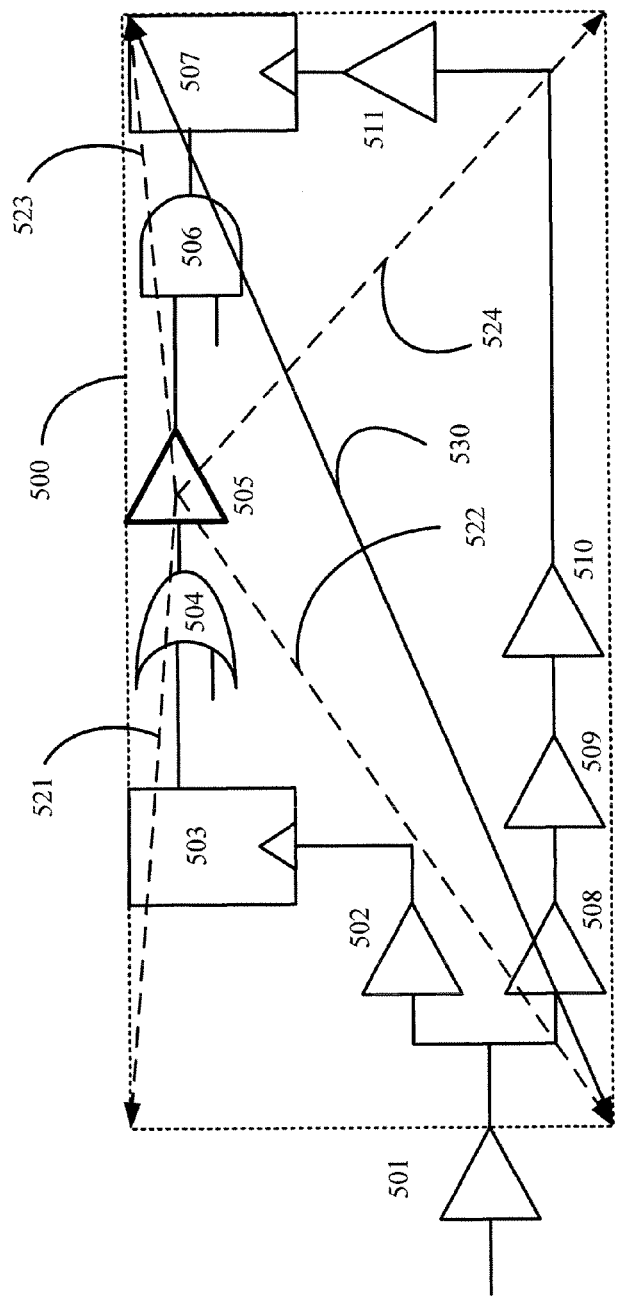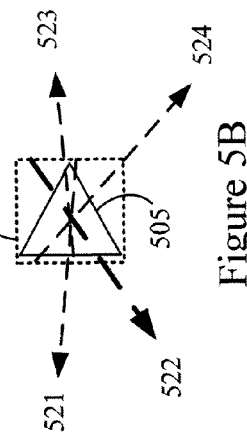
Figure 5A
Figure 5B

```
800
801     Find the worst arrival time worst_arr
802     Define derate_min as distance derate for zero bounding box
803     Define derate_max as distance derate from old bounding box
804     For each arrival time in max mode {
805         If (arr < worst_arr * derate_min / derate_max)
                Drop bounding box from arr
806         } else {
                Propagate bounding box from arr
            }
        }
807     For each arrival time in min mode {
808         If (arr > worst_arr * derate_min / derate_max)
                Drop bounding box from arr
809         } else {
                Propagate bounding box from arr
            }
        }
```

Figure 8

DUAL-BOX LOCATION AWARE AND DUAL-BITMAP VOLTAGE DOMAIN AWARE ON-CHIP VARIATION TECHNIQUES

RELATED ART

Current integrated circuit (IC) designs may include close to tens and hundreds millions cells, e.g. logic gates and synchronous elements (such as flip-flops and latches), connected by nets. In a synchronous design, data advances through the synchronous elements based on a clock signal. As a result, either hold or setup time violations may be introduced. A hold time violation is when an input signal changes too quickly after an active transition of the clock signal. A setup time violation is when a signal arrives too late, i.e. missing the time when it should advance to the next synchronous element.

Static timing analysis (STA) is a now ubiquitous method used in the electronic design automation (EDA) industry to quickly compute the expected timing of the design. Typically, STA tools compute conservative, i.e. worst-case, delays to ensure a safe, albeit pessimistic, timing analysis.

Unfortunately, due to the continuing reduction in transistor feature sizes, timing constraints for ICs are becoming increasingly stringent. As a result, it is becoming extremely difficult to design ICs using current STA techniques due to their overly pessimistic timing analyses (described in further detail below). Therefore, a need arises for a method and apparatus that reduces timing pessimism during STA.

Additionally, many current designs include multiple voltage domains. Because each voltage domain can independently scale frequency and voltage, the number of possible voltage corners can increase exponentially. Therefore, a need arises for a method and apparatus that can effectively reduce the number of potential voltage corners.

SUMMARY

Advanced on-chip variation (AOCV) techniques attempt to capture the impact of spatial variation and multiple voltage domains in static timing analysis (STA). A standard distance-based AOCV technique uses a single bounding box for a timing path and a calculated diagonal distance from the corners of the bounding box to query a derate database. This solution assumes that all cells of the launch path of the timing path are at one corner of the bounding box and all cells on the capture path are at the opposite corner. This assumption is very pessimistic especially for global timing paths.

A dual-box location-based on-chip variation (DBLOCV) can be used in STA to significantly reduce pessimism. In one DBLOCV method of performing STA, at least a placed design of an integrated circuit can be read. In other embodiments, a placed and routed design can be read. The coordinates of the cells of the design can be determined. DBLOCV analysis can be performed. Notably, the DBLOCV analysis includes forming a backward bounding box and a forward bounding box for a cell of the design. A first intermediate maximum distance from the cell to corners of the backward bounding box can be calculated using the coordinates. A second intermediate maximum distance from the cell to corners of the forward bounding box can be calculated using the coordinates. A derate value can be determined from the derate table using the maximum distance of the first and second intermediate maximum distances. STA can be performed using the derate value. At least one timing report can be generated based on the STA. In one embodiment, calculating the distances from the cell to the corners can include forming a cell box for the cell and adding a distance traversing the cell box to each distance to a corner. In another embodiment, when the cell is an end-point cell, the backward bounding box can be reduced by overlapping the backward bounding box with a common clock point forward bounding box, wherein an overlap region defines a reduced backward bounding box for the cell. In this case, calculating the first intermediate maximum distance is performed using the reduced backward bounding box for the cell.

Compared with existing techniques, the DBLOCV analysis removes significant pessimism while still providing safe results. The DBLOCV analysis can remove the impact from clock re-convergence pessimism (CRP) and/or the pessimism impact of non-critical side paths in graph-based STA. With the removed pessimism, designers are able to have more timing margin to trade off for better power and area for chips.

Another advanced location-based on-chip variation (ALOCV) model can be used in STA to significantly reduce pessimism. In one method of performing STA, at least a placed design of an integrated circuit can be read. In other embodiments, a placed and routed design can be read. The coordinates of the cells of the design can be determined. The ALOCV analysis can be performed. Notably, the ALOCV analysis includes calculating the four distances from a cell to the four corners of a bounding box including the cell using the coordinates. A derate value can be determined from a derate table using the maximum distance of the four distances. STA can be performed using the derate value. At least one timing report can be generated based on the STA. In one embodiment, calculating the four distances can include forming a cell box for the cell and adding a distance traversing the cell box to each of the four distances.

In another method of performing STA, the voltage domains of cells of the design can be determined. A dual-bitmap voltage domain aware on-chip variation (DBVOCV) analysis, which includes generating forward bitmaps and backward bitmaps for a plurality of cells of the design, can be performed. A common point cell can be identified from an end-point cell of the design (the plurality of cells between and including the end-point cell and the common clock point cell). An intersection of a forward bitmap of the common clock point cell and a backward bitmap of the end-point cell can be calculated. Any voltage domain that is only on a common clock path based on the intersection can be identified and eliminated. Multiple voltage domain STA can be performed based on at least two identified voltage domains. At least one timing report based on the STA can be generated.

A non-transitory, computer-readable medium storing computer-executable instructions for performing static timing analysis (STA) is also described. These instructions when executed by a processor cause the processor to execute one or more of the described processes. An electronic design automation (EDA) program to be executed by a computer is also described. This EDA program can perform one or more of the described processes.

BRIEF DESCRIPTION OF THE DRAWINGS

FIG. 5A illustrates one embodiment of an improved LOCV technique in which the actual maximum distance from a given cell to the four corners of the bounding box can be used as the distance to query the derate table.

FIG. 5B illustrates how the distance calculations can be performed for a cell using a cell box.

FIG. 8 illustrates a technique that describes in pseudo-code the steps for merging or dropping bounding boxes of non-critical paths.

DETAILED DESCRIPTION OF THE DRAWINGS

The design and fabrication of ICs involve complex physical and chemical processes, any of which can cause chip-to-chip variations and/or on-chip variations of the timing-related parameters. The impact of chip-to-chip variation can be captured by analyzing the IC design using different process corners. These process corners refer to a plurality of fabrication parameters, such as voltage, temperature, and clock frequency, which can be used when applying an IC design to a wafer. If the IC fails to function at any of these process corners (generally set as extremes), then the design is considered to have inadequate design margin.

Some STA techniques model on-chip variation using a global derating factor. This derating factor is used to change (or derate) delays to reflect on-chip variation. Note that the delay of a path includes the sum of the delays of stages along the path, where a stage is defined as a net and its driving cells. A stage can also include other nets coupled to the net of the stage. Derating allows designers to modify delay computations performed by the timer of the STA tool. Unfortunately, applying a global derating factor to every delay ignores the context or location where each delay occurs.

Figure 1:
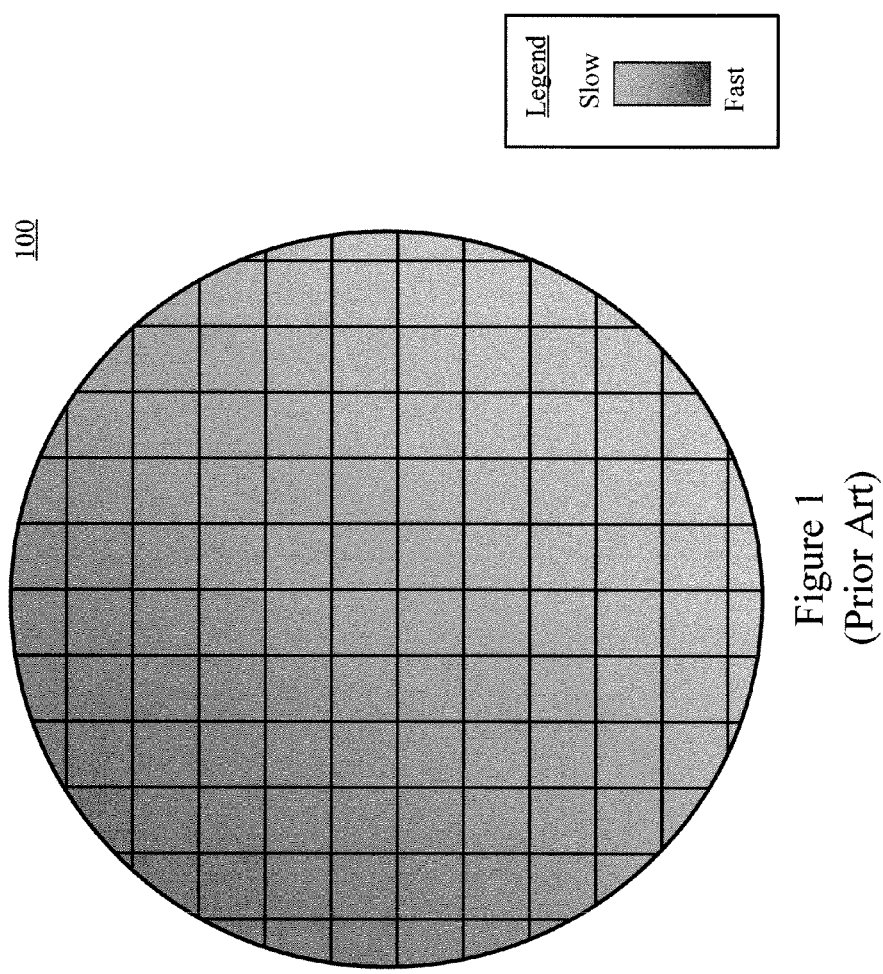
FIG. 1 illustrates an exemplary wafer having both chip-to-chip and on-chip variations.

FIG. 1 illustrates an exemplary wafer 100 having both chip-to-chip and on-chip variations. As shown in FIG. 1, because significant variations in delay occur across a chip, a STA technique that accounts for on-chip variation using a global derating factor necessarily adds significant pessimism to the timing analysis. Over-pessimism results in an overly slow circuit, or even the potential risk of circuit malfunction.

Figure 2:
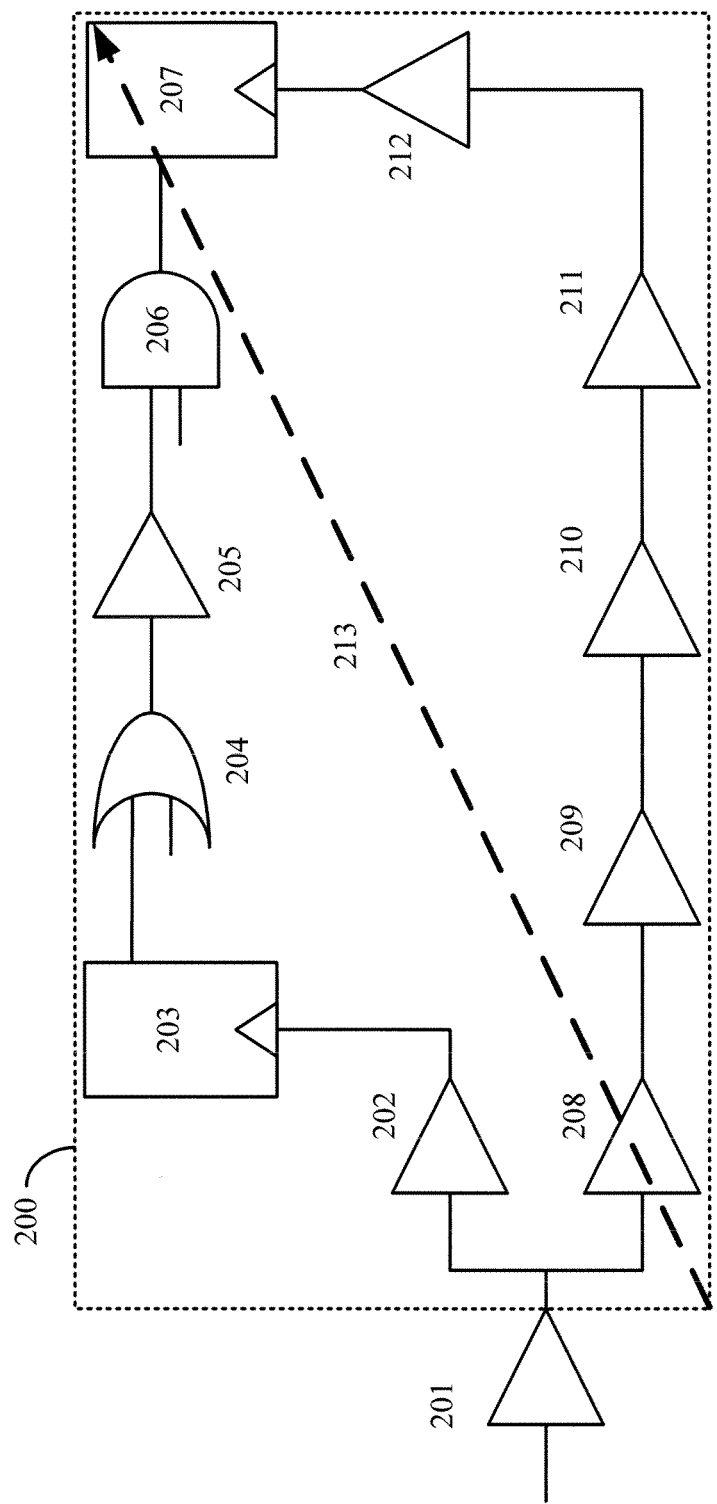
FIG. 2 illustrates an exemplary portion of a design including a common path that divides into a launch path and a capture path.

To overcome this pessimism, an advanced on-chip variation (AOCV) model can provide different derating factors on different paths of a design. AOCV models can derate $\Gamma$ as a function of distance and path depth, i.e. $\Gamma=f(\text{distance, path depth})$ (wherein path depth is interchangeably used for the stage count). FIG. 2 illustrates an exemplary portion of a design including a "common path" that divides into a "launch path" and a "capture path". The common path includes buffer 201. The launch path includes a buffer 202, a flip-flop 203, an OR gate 204, a buffer 205, an AND gate 206, a flip-flop 207, and various nets connecting these cells. The capture path includes a plurality of buffers 208-212 and the nets connecting those cells. The depth of the launch path is 6 (wherein each cell counts as "1"), whereas the depth of the capture cell path is 5. Note that a depth of a path corresponds to a same number of stages (e.g. a depth of 5=5 stages).

Distance-based OCV, which is also called location-based OCV (LOCV), is used to model systemic variation across a chip. LOCV is based on the premise that the further cells are apart, the greater their probability of systemic variations (and thus, logically, cells in greater proximity exhibit less systemic variation). Systemic variations are caused by proximity effects, density effects, and other factors associated with the location/pattern of cells in the design. Exemplary systemic variations include variations in gate length (or width) and interconnect width.

A LOCV model can create a bounding box for a selected portion of the design that has launch and capture paths. The sides of the bounding box are formed to "touch" the outermost cells of each path. That is, because STA is performed after placement and routing, the physical placement information regarding the cells is known. Therefore, a side of the bounding box can be placed immediately adjacent the cell boundary as defined by the place and route tool. Note that bounding boxes can be provided for either cells or nets, and cells and nets have different derate tables. A standard STA tool can coordinate the use of derate values for cells and nets to ensure that additional pessimism is not added to the design.

In the design shown in FIG. 2, the left side of a bounding box 200 touches the output of buffer 201 (i.e. the end of the common path), the right side touches flip-flop 207, the top side touches flip-flop 203, and the bottom side touches each of buffers 208-211. The LOCV model calculates a diagonal distance 113 (e.g. measured in nanometers or any other appropriate distance measurement) connecting opposite corners of bounding box 200. An STA tool using AOCV models includes a derate look-up table indexed by distances and depths. Thus, once distance 213 is calculated and the depth, i.e. the stage count for the launch path or the capture path, is determined, the STA tool can query the LUT and select the appropriate derate. The selected derate value is then applied to all cells on the launch and capture paths.

The diagonal distance computation impliedly assumes that all launch cells are on one corner of the bounding box and all capture cells are on the other corner. Because a place and route tool would typically distribute the cells more evenly on the path, this assumption results in overly pessimistic timing analysis.

Moreover, when LOCV is extended from path-based analysis to graph-based analysis (which looks at the full chip and covers all paths from primary input to primary output), the bounding box covers all the fan-in and fan-out cones of a given cell, thereby introducing additional sources of pessimism. Specifically, to extend path analysis to graph analysis, a determination is made as to how many paths a given cell is involved in. The deratings across all the paths of the chip in which the cell is involved (fan-ins and fan-outs) are determined, and the worst derating is then used for the given cell.

Figure 3:
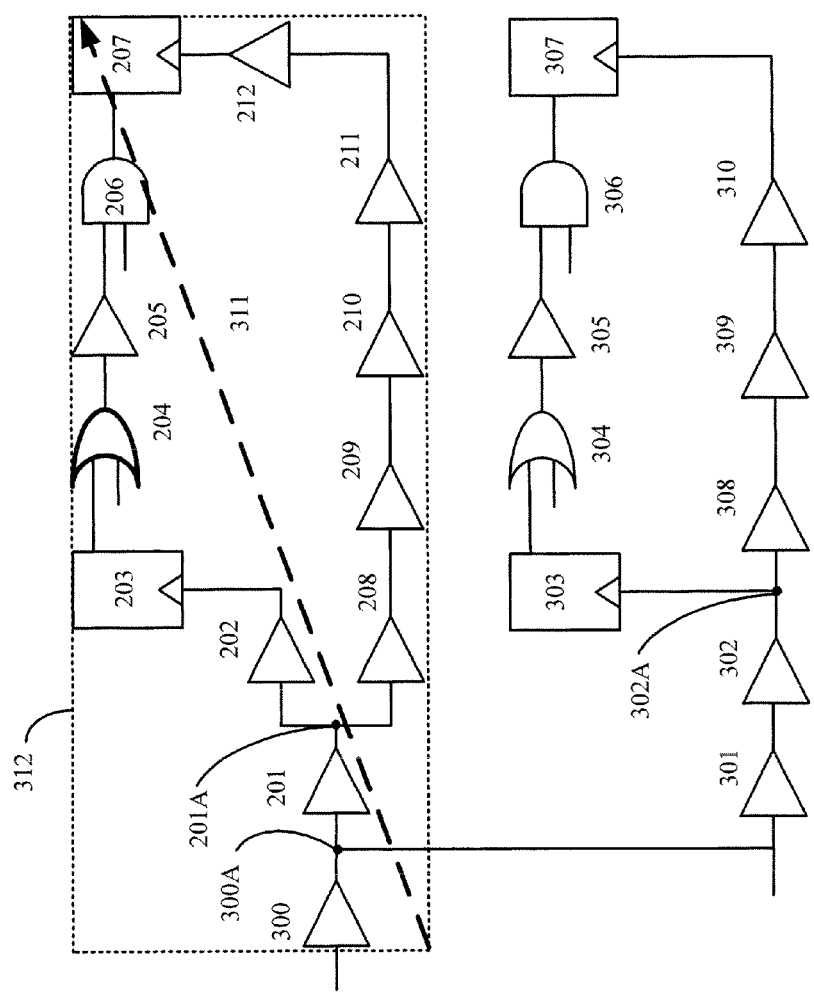
FIG. 3 shows an exemplary circuit that may result in clock re-convergence pessimism.

One pessimism introduced in graph-based LOCV is from clock reconvergence pessimism. FIG. 3 shows an exemplary circuit including the design of FIG. 2 (cells 201-212) and additional cells 300-310. As shown, buffer 300 provides an output to both buffer 201 and buffer 301. Note that for the launch path including cells 202-207 and the capture path including cells 208-212 share a common segment in the clock tree until a node 201A, called the common point. Each cell has two types of delay, i.e. the maximum (max) delay and the minimum (min) delay. Timing conditions may arise where a max delay should be used for the launch path and a min delay should be used for the capture path. However, in an actual circuit, common point 201 can only propagate a single value of delay to the cells in both paths. Therefore, a timing report may include artificially-introduced pessimism that is derived from max and min delays for the launch and capture paths. The value of this pessimism is the difference between max and min delays at the common point and is called the "clock reconvergence pessimism" (also referenced as CRP herein). Note that the launch path including cells 303-307 and the capture path including cells 308-310 may also similarly include clock reconvergence pessimism. Another common point 300A exists at the graph level, wherein the clock signal is propagated to both cells 201 and 301 (i.e. a fan-out). Therefore, timing analysis at the graph level in the design of FIG. 3 also has clock reconvergence pessimism.

Note that a bounding box for OR gate 204 should theoretically not include the common path, e.g. cell 201. However, during graph-based analysis, the common path information is not available while bounding box 312 of OR gate 204 is calculated. Therefore, bounding box 312 has to include the entire common path including cell 201 and the nets including common points 201A and 300A to avoid potential optimism. Note that in graph-based analysis, cell 300 is also typically included in bounding box 312 because of the difficulty of excluding it.

Figure 4:
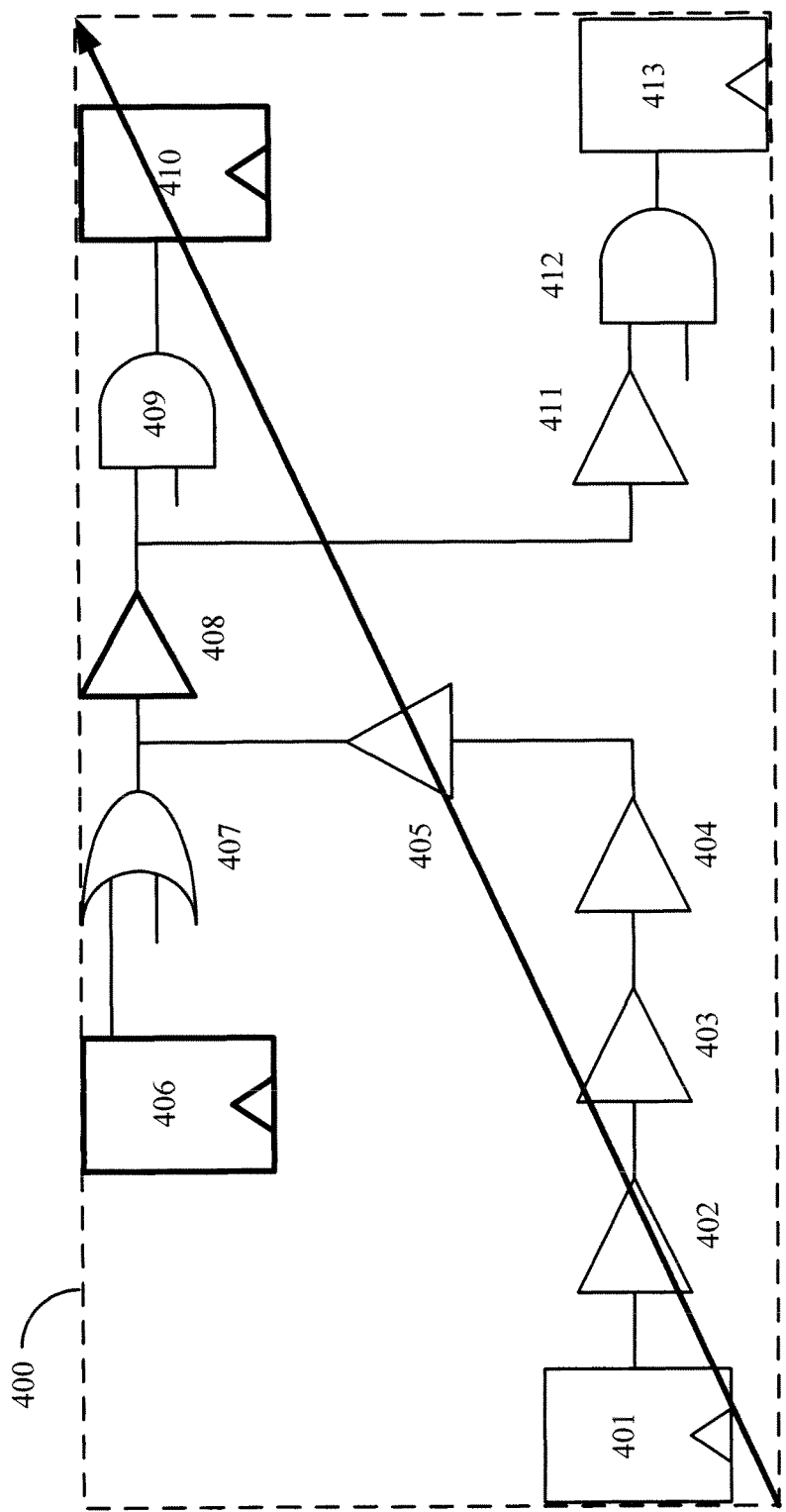
FIG. 4 shows a portion of a design that may have pessimism from the impact of non-critical paths.

Another source of pessimism in graph-based LOCV is from the impact of non-critical paths. This pessimism is especially severe for min paths (i.e. minimum delay paths) because they tend to be short and should have relatively small bounding boxes. For example, FIG. 4 shows a portion of a design including cells 401-413. In FIG. 4, a bounding box 400 for cell 408 covers all three paths (i.e. a first path including cells 406, 407, 408, 409, and 410, a second path including cells 401-405, and a third path including 411-413) because of fan-in and fan-out for graph-level timing analysis. However, bounding box 400 introduces a significant pessimism if only the min path between cell 406 (flip-flop) to cell 410 (flip-flop) is considered.

In accordance with improved LOCV techniques, the knowledge of the locations for the cells when building the bounding box can be advantageously used to shrink the calculated distance, thereby resulting in a more realistic and less pessimistic derate value. FIG. 5A illustrates one embodiment of an improved LOCV technique in which the actual maximum distance from a given cell to the four corners of the bounding box can be used as the distance to query the derate table. In the design shown in FIG. 5A, a launch path includes cells 502-507 and a capture path includes cells 508-511. As is usual, the common clock path including cell 501 is excluded from a bounding box 500, which is created to bound the cells of both the launch and capture paths. Notably, for a given cell 505, the distances 521, 522, 523, and 524 from cell 505 to each of the corners of bounding box 500 can be calculated. Based on those calculations, the maximum distance (in this case, distance 522) can be identified and then used as the distance to query the derate table instead of distance 530 (corner to corner of bounding box 500).

In accordance with the above-described "four-corner" LOCV, each cell is analyzed and a derate value is determined for that cell based on the maximum distance from the cell to one of the four corners. A cell, such as cell 505 in FIG. 5A, located near the mid-section of bounding box 500 (orthogonal to the longer sides of the bounding box) will eliminate the most pessimism because the maximum distance is approximately 50% less than the standard corner-to-corner diagonal distance. In any event, the maximum distance of the four corner distances still represents a realistic worst case distance because it is still the maximum distance from the cell to all corners of the bounding box. Therefore, the maximum four-corner distance can provide a safe derate value for each cell within bounding box 500.

In one embodiment, for increased accuracy (and a slightly more conservative distance), the distance is calculated based on a distance calculated from a far side of the cell to its corresponding opposite corner of the bounding box. FIG. 5B illustrates how the distance calculations can be performed for cell 505 using a cell box 540. For example, the distance 522 to the lower left corner of bounding box 500 (shown in FIG. 5A) would be calculated by including the distance to the upper right corner of cell box 540, as shown by the bold dashed arrow. Similar distances would be computed for distances 521, 523, and 524, as shown.

Figure 6:
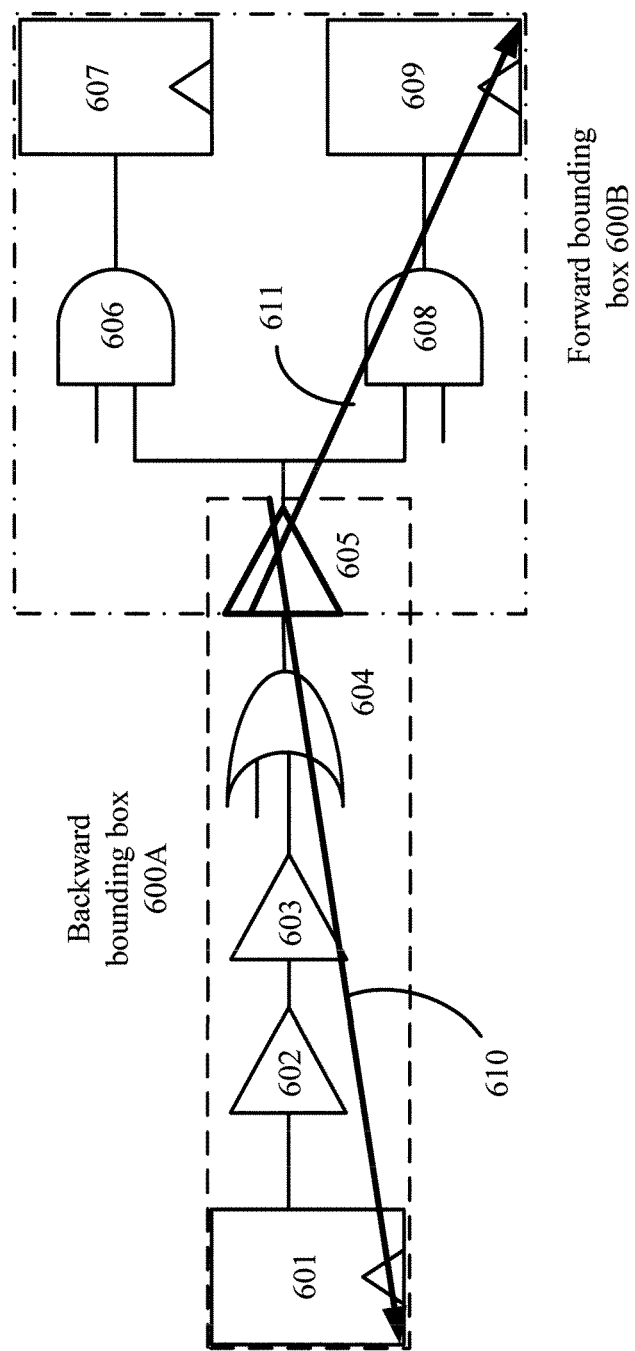
FIG. 6 illustrates a dual-box LOCV (DBLOCV) technique that splits the bounding box into a backward bounding box and a forward bounding box.

To further reduce pessimism, a dual-box LOCV (DBLOCV) technique can advantageously split the bounding box into a backward bounding box and a forward bounding box. The backward bounding box covers all fan-in cells for a given cell, whereas the forward bounding box covers all fan-out cells of the given cell. FIG. 6 shows an exemplary design including cells 601-609. For this design, assuming cell 605 is the given cell, the fan-in includes cell 604 and its upstream cells and the fan-out includes cell 604 and its downstream cells. Note that an actual circuit does not have loops. Therefore, a segment may be in the fanin or fanout region, but not both. In the absence of fan-in or fan-out cells for a given cell, a zero bounding box is created (described in further detail below).

When cell 605 is selected, a backward bounding box 600A including cells 601-605 (and the fan-in associated with cell 604, not shown for simplicity, but assumed to be located within the perimeter of backward bounding box 600A) can be created. A forward bounding box 600B including cells 605-609 (and the fan-outs associated with cells 606 and 608, also not shown for simplicity, but assumed to be located within the perimeter of forward bounding box 600B) can be created. In general, a forward bounding box will end with a capture flip-flop (similar to that of a standard bounding box), a backward bounding box will start with the common point (not shown in FIG. 6, but similar to that of a standard bounding box). Note that the sizes of backward bounding box 600A and forward bounding box 600B (also generically called reduced bounding boxes) are tailored for the specific cells therein. Note that because fewer cells are typically in each of the reduced boundary boxes, the size of each of these two boxes is probably smaller than that of the standard boundary box.

Once again, the actual location of the selected cell and the boundaries of the reduced boundary boxes can be used to calculate distances. For example, for cell 605, four intermediate distances from cell 605 to the four corners of backward bounding box 600A can be calculated. The maximum intermediate distance, in this design first maximum intermediate distance 610, can be identified. Additionally, four intermediate distances from cell 605 to the four corners of forward bounding box 600B can be calculated. The maximum intermediate distance, in this design second maximum intermediate distance 611, can be identified. In one embodiment, a cell box technique, as explained in reference to FIG. 5B, can be used to fine tune the intermediate distances (because the actual location of the transistor driver within the cell is unknown, the most conservative distance based on a cell's boundary can be used instead). The longer of the first and second maximum intermediate distances (in FIG. 6, distance 610) can be chosen as the final maximum distance, which can be used to query the derate LUT.

The above-described creation of backward and forward bounding boxes for analysis of DBLOCV can be performed for each cell of the launch path in graph-based analysis. Therefore, each cell has its own derate value. Notably, the final maximum distance for each cell will be smaller than the diagonal distance calculated for the standard bounding box. Thus, using forward and backward bounding boxes can provide significant bounding box reduction for graph-based analysis.

Note that the DBLOCV analysis can consider combined launch and capture paths for more conservative results. That is, the forward and backward bounding boxes created for a given cell when considering the cells of the launch and capture paths will typically increase the size of at least one of the forward and backward bounding boxes for that given cell. Therefore, the forward and backward bounding boxes can be created based on cells of the launch path or based on cells of both the launch path and the capture path. Note that either analysis is valid; however, the analysis based on cells of the both the launch and capture paths inherently is more conservative than the analysis based on just cells of the launch path.

Figure 7A:
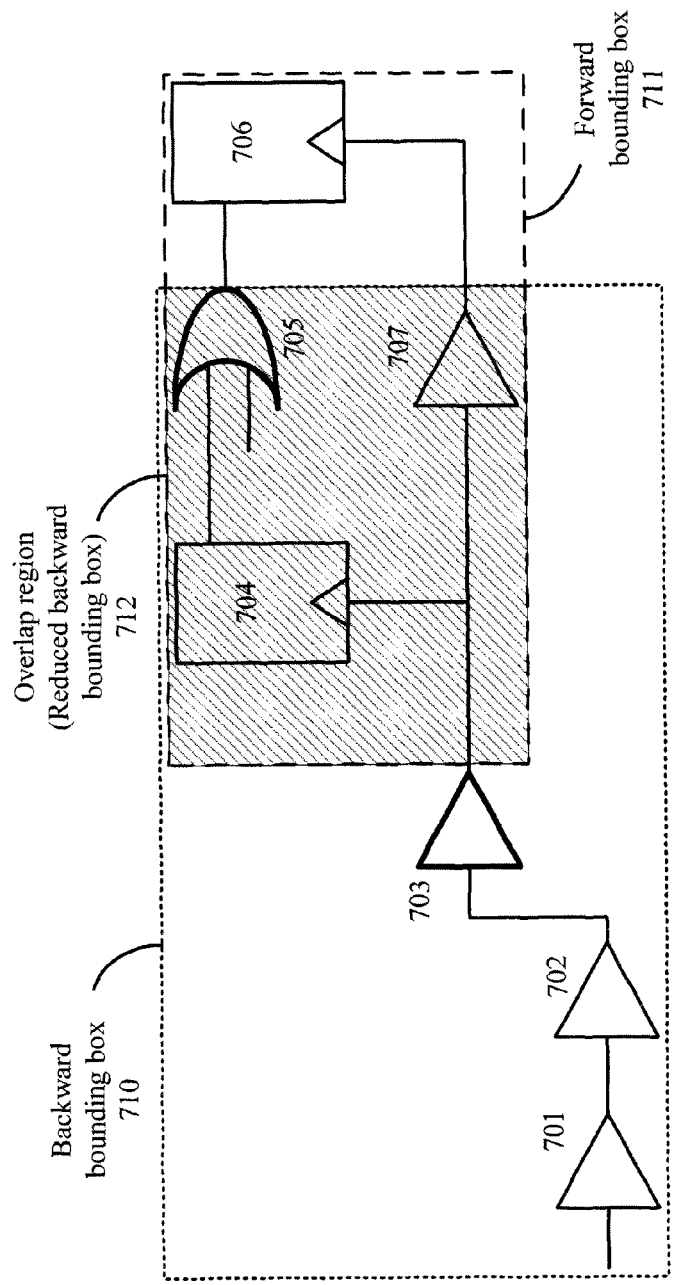
FIG. 7A illustrates how clock re-convergence pessimism introduced by graph-based analysis can be removed by overlapping forward and backward bounding boxes.

Clock re-convergence pessimism introduced by graph-based analysis can also be removed by overlapping forward and backward bounding boxes. FIG. 7A illustrates an exemplary design including cells 701-706. Note that in graph-based analysis, a standard bounding box would include all of cells 701-706. In this design, cell 705 is on the launch path right before cell 706, which is the capture flip-flop, and cell 703 is the last cell on the common path for cell 705. Notably, a backward bounding box 710 for cell 705 and a forward bounding box 711 for cell 703 form an overlapped region 712. This overlapped region 712 is a reduced backward bounding box for cell 705 that excludes the common path. Therefore, for an end-point cell like cell 705 (which is directly connected to a capture flip-flop, cell 705 also called the clock end-point cell), its backward bounding box can be reduced by overlapping it with the forward bounding box of the last cell of the common path (also called the CRP branching pin and the common point cell).

Figure 7B:
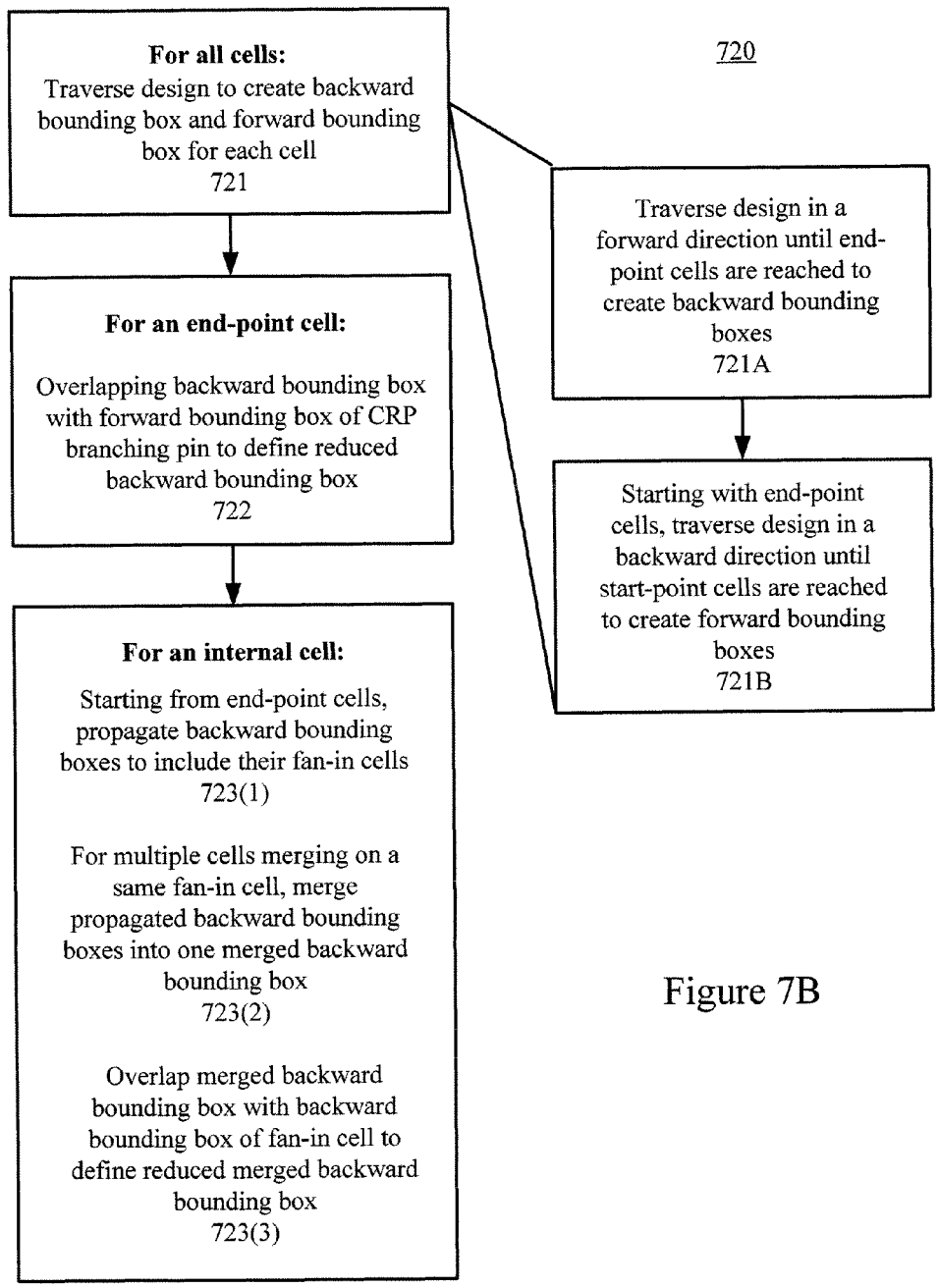
FIG. 7B illustrates an exemplary dual-box LOCV technique that addresses both end-point and internal cells.

Note that finding the CRP branching pin of an end-point cell is relatively straight forward. However, finding the CRP branching pin(s) for an internal cell may be more challenging because the number of internal cells is significantly larger than the number of end-point cells. FIG. 7B illustrates an exemplary technique 720 that addresses both end-point and internal cells. In step 721, a design can be traversed to create backward and forward bounding boxes for each cell. Note that step 721 can include two steps 721A and 721B. In step 721A, the design can be traversed in a forward direction (e.g. using a timing graph) from start-point cells (i.e. inputs to the design or outputs of flip-flops) until end-point cells (i.e. outputs to the design or inputs to flip-flops) are reached. This forward traversal can create the backward bounding boxes. In step 721B, the design can be traversed in a backward direction (e.g. using the timing graph) from the end-point cells until the start-point cells are reached. This backward traversal can create the forward bounding boxes. Thus, at the end of step 721, all backward and forward bounding boxes for all cells are known. Moreover, all end-points have identified dominant common points, which can be identified through standard STA.

In step 722, when the cell is an end-point cell, then its backward bounding box can be reduced by overlapping it with the forward bounding box of the CRP branching pin (as shown in FIG. 7A). When the cell is not an end-point cell, i.e. the cell is an internal cell, then starting from the end-point cells of the design, their backward bounding boxes can be propagated to their fan-in cells in step 723(1). In step 723(2), when multiple end-point cells merge on the same fan-in cell, then the propagated backward bounding boxes can be merged into one merged backward bounding box. In step 723(3), the merged backward bounding box can be overlapped with the backward bounding box of the fan-in cell for the given cell. Note that different fan-ins can be merged separately.

Figure 7C:
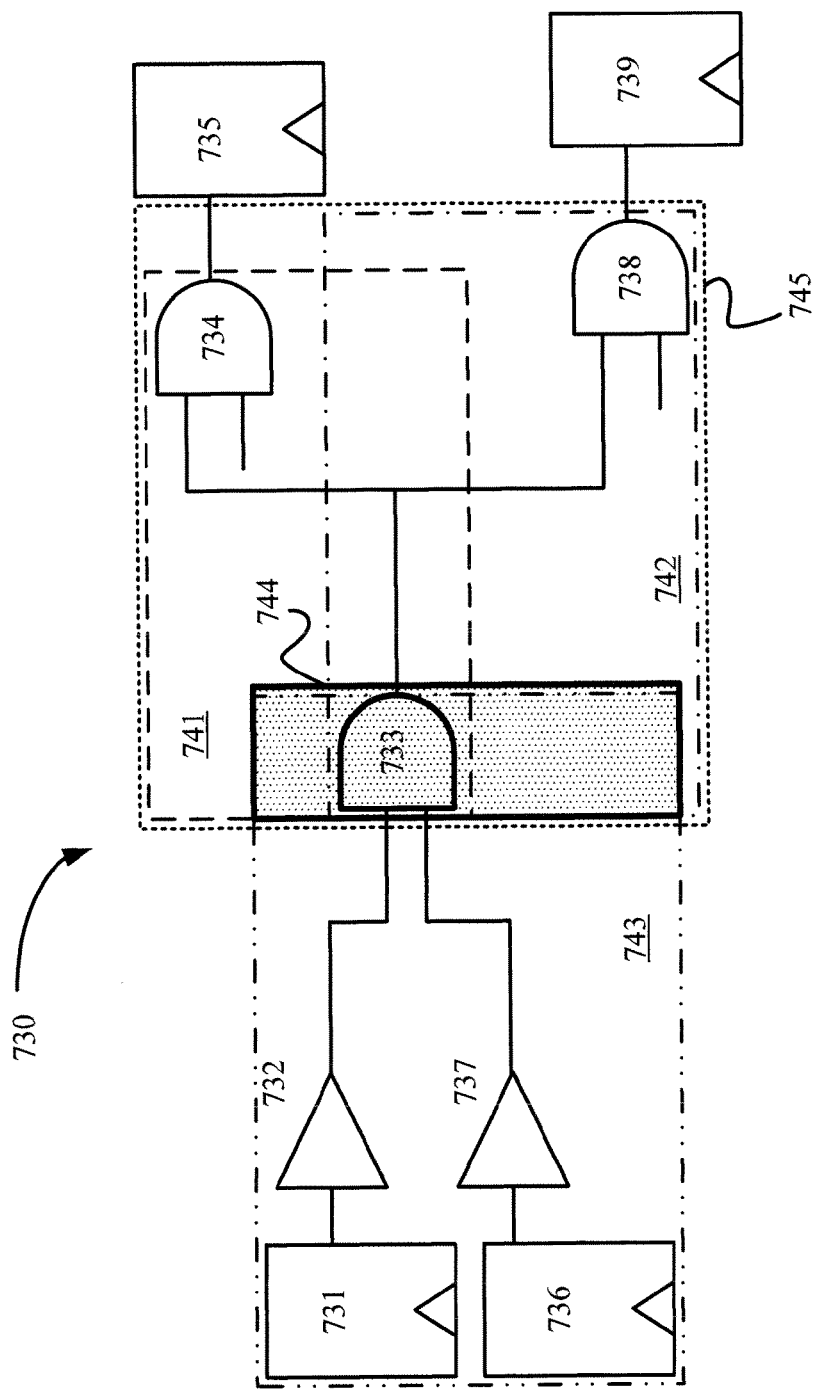
FIG. 7C show how the dual-box LOCV technique of FIG. 7B can be applied to an exemplary design.

FIG. 7C illustrates applying technique 720 to an exemplary design 730 including cells 731-739. In step 721, for cell 733, a timing graph can be traversed to create a backward bounding box 743 and a forward bounding box (not shown for simplicity). Because cell 733 is not an end-point cell, thereby identifying it as an internal cell, then backward bounding boxes 741 (dashed box) and 742 (dashed-dot box) of end-point cells 734 and 738 (which are identified as the end-point cells connected to cell 733), respectively can be propagated to include just their fan-in cells in step 723(1). Because end-point cells 734 and 738 merge on the same fan-in cell 733, then the propagated backward bounding boxes can be merged into one merged backward bounding box 745 (dotted box) in step 723(2). In step 723(3), merged backward bounding box 745 can be overlapped with backward bounding box 743 of fan-in cell 733 to define the reduced backward bounding box 744 for cell 733 (shown as shaded area).

In accordance with an improved DBLOCV model, launch path pessimism due to non-critical paths can also be removed using backward and forward bounding boxes. To remove pessimism from non-critical paths, critical paths must first be identified. However, identifying critical paths should follow applying one or more derates to cell delays and calculating the arrival time after the derate application. Therefore, to overcome the inter-dependency between these two processes, an iterative algorithm can be used.

FIG. 8 illustrates a technique 800 that describes in pseudo-code the steps for merging or dropping backward bounding boxes of non-critical paths (wherein the bounding boxes referenced in technique 800 are backward bounding boxes, for simplicity called bounding boxes in the pseudo-code). In technique 800, the worst arrival time (worst_arr) can be found in step 801. The distance derate for a zero backward bounding box is a minimal distance defined in step 802, i.e. derate_min (e.g. 1.01-1.10). The distance derate from a standard (old) backward bounding box is defined in step 803, i.e. derate_max.

In steps 804-806, for each arrival time in the max mode, if the arrival time is less than the worst arrival time multiplied by (derate_min/derate_max), then the backward bounding box can be dropped from the arrival analysis. Otherwise, the backward bounding box is propagated. In steps 807-809, for each arrival time in the min mode, if the arrival time is greater than the worst arrival time multiplied by (derate_min/derate_max), then the backward bounding box can be dropped from the arrival analysis. Otherwise, the backward bounding box is propagated.

During the propagation, the backward bounding box can be refined by dropping the backward bounding box from non-critical paths. In other words, when the arrival time merges at the output of multi-input cells (i.e. arrives at the same time), only the backward bounding boxes of worst min/max arrivals are propagated. Once the arrival time propagation is done, required time propagation can be performed to refine the forward bounding box in a similar manner. After that, another arrival time propagation using the refined backward and forward bounding boxes can be launched.

Thus, technique 800 ensures that a dropped backward bounding box has no chance of becoming critical by dropping a backward bounding box only when the arrival time is faster in max mode (or slower in min mode) than the critical path arrival time (i.e. derate_min/derate_max) even if the critical arrival time has a zero distance backward bounding box. Otherwise, the backward bounding box is merged with its fan-ins, as described above.

In one embodiment, technique 800 can be repeated for at least two rounds of arrival time propagation. To provide more optimized resource management, technique 800 can be integrated with other analysis with similar requirements (such as signal integrity analysis).

As described above, the four-corner LOCV model or the dual-box LOCV model can be used to remove extra pessimism compared to existing distance-based OCV models. Based on simulations performed using these advanced LOCV models, the derate margin can be reduced by 25% on average and close to 50% for cells that are clustered around the center of the standard bounding boxes (path level). These advanced LOCV models can also significantly reduce the additional pessimism in graph-based STA due to distance-based OCV by accounting for CRP and/or pessimism due to sub-critical paths.

Figure 9:
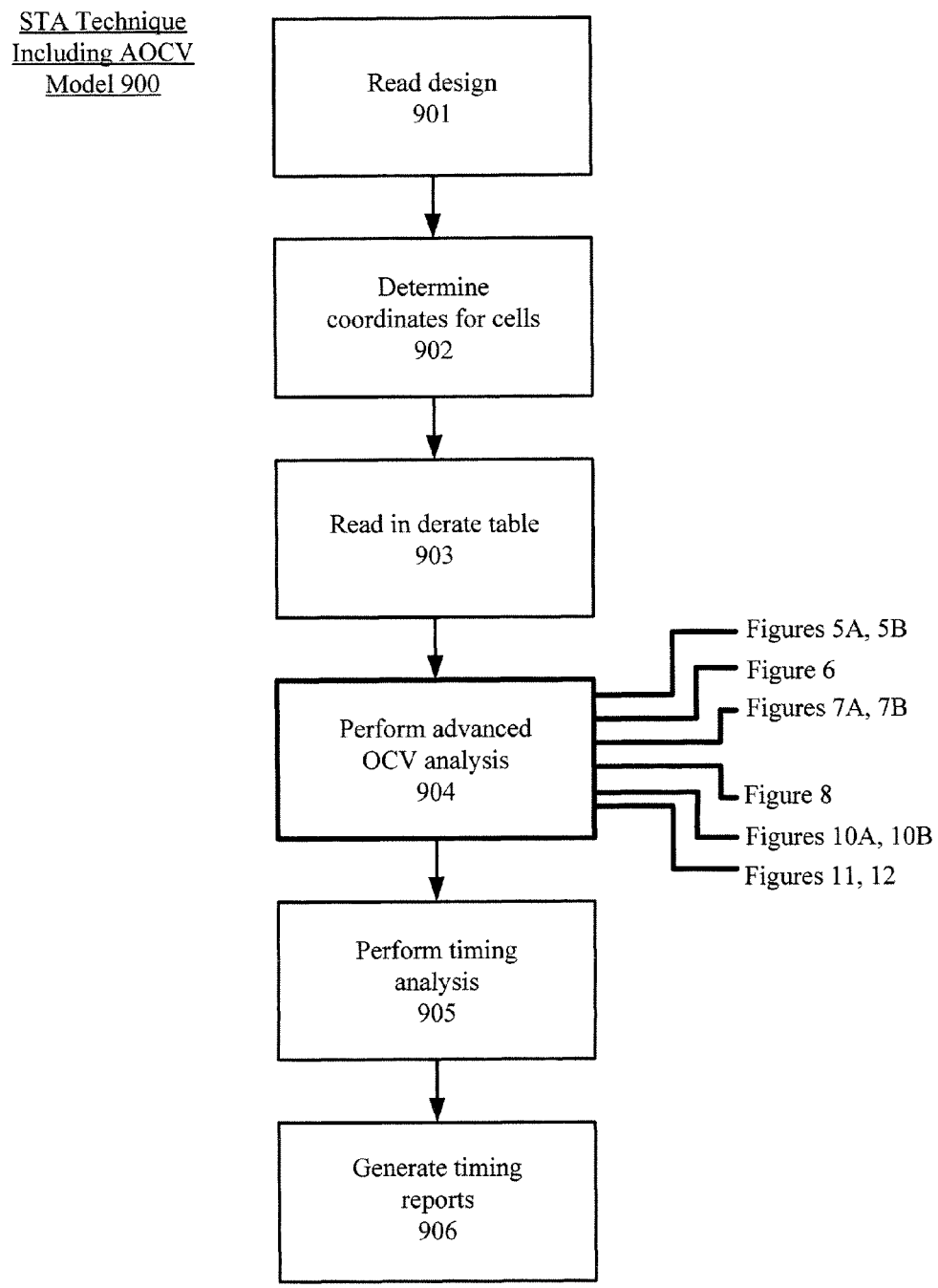
FIG. 9 illustrates an exemplary STA technique including the four-corner LOCV technique, the dual-box LOCV technique, and/or the dual-bitmap VOCV propagation technique.

FIG. 9 illustrates an exemplary STA technique 900 including the four-corner LOCV technique (see, e.g. FIGS. 5A, 5B) or the dual-box LOCV technique (see, e.g. FIGS. 6, 7A, 7B, 7C(1), 7C(2), 8). In step 901, an integrated circuit design can be read by an EDA system. In one embodiment, this design is at least placed. In other embodiments, this design can be placed and routed. In step 902, the coordinates for the cells of the design can be determined. In step 903, a derate table can be read. An exemplary derate table is shown below as Table 1. Note that the derate values in Table 1 can vary based on technology node and other process parameters, such as device and interconnect process corners, operating voltage and temperature etc., which would be known by those skilled in the art.

TABLE 1

Exemplary Derate Table

| Distance | Depth | | | | | | |
|---|---|---|---|---|---|---|---|
| | 1 | 2 | 3 | 4 | 5 | 10 | 50 |
| 1000 | 1.130 | 1.099 | 1.085 | 1.078 | 1.074 | 1.063 | 1.055 |
| 2000 | 1.130 | 1.099 | 1.086 | 1.079 | 1.074 | 1.063 | 1.055 |
| 3000 | 1.131 | 1.100 | 1.086 | 1.079 | 1.075 | 1.064 | 1.056 |
| 4000 | 1.131 | 1.102 | 1.087 | 1.080 | 1.076 | 1.065 | 1.057 |
| 5000 | 1.133 | 1.105 | 1.089 | 1.082 | 1.078 | 1.068 | 1.061 |
| 6000 | 1.135 | 1.108 | 1.092 | 1.086 | 1.082 | 1.072 | 1.065 |
| 8000 | 1.137 | 1.112 | 1.095 | 1.089 | 1.085 | 1.076 | 1.070 |
| 10000 | 1.140 | 1.120 | 1.100 | 1.094 | 1.090 | 1.082 | 1.075 |

In step 904, an AOCV analysis can be performed. This analysis can include at least one of the advanced LOCV models described above in reference to FIGS. 5A, 5B, 6, 7A, 7B, and 8. In step 905, timing analysis can be performed using an STA tool. In step 906, timing reports for the design, both path-based and graph-based, can be generated.

In one embodiment, the above-described dual-box model can be modified to use bitmaps, which can then be applied to graph-based timing analysis for designs with multiple voltage domains. In designs that have multiple voltage domains, each domain can independently scale frequency and voltage. Therefore, multiple voltage domains can potentially increase the number of voltage corners exponentially if analysis enumerates all possible voltage combinations of different domains. For example, if a design has four voltage domains and each domain has 2 voltage levels (i.e. high and low), then $2^4=16$ voltage corners are possible. On the other hand, because only limited cross-domain paths are available, a simultaneous multi-corner solution is viable.

Note that voltage and delay usually have a monotonic relationship. And the launch and capture paths generally share common voltage domains. However, some launch and capture paths may not share common voltage domains. In that case, the complexity of analyzing the arrival times, required times, and slacks increases significantly. Notably, the cross-voltage domain paths are typically only a small portion of the design. The challenge is how these cross-voltage domain paths can be efficiently identified. The above-described dual-box technique can be modified to identify these cross-voltage domain paths. The modification involves using bitmaps to replace the bounding boxes, wherein the bitmaps can identify the cross-domain paths that exclude impact from the common clock path. After these cross-domain paths are identified, other techniques can be used to further reduce the unnecessary combinations to stream-line STA.

In one embodiment, a bitmap notation can be used to carry voltage domain information from a fan-in cone of a cell, and calculate the corners that are only included in the bitmaps. (Note that although these notations are described below with respect to cells, this notation applies equally to nets.) By using this notation, the internal paths inside each voltage domain will only see that domain's processing corners. This information can be used to capture design cells that are not connected to the outside of their voltage domains.

Figure 10A:
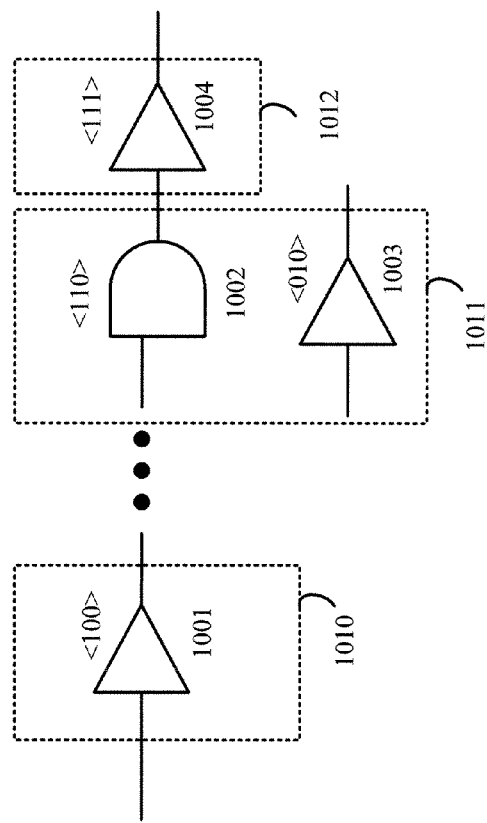
FIG. 10A illustrates an exemplary design with bitmap notation to indicate voltage domain information.

FIG. 10A illustrates an exemplary notation for a design including cells 1001, 1002, 1003, and 1004. A dotted box indicates a voltage domain. Thus, in FIG. 10A, cell 1001 has a first voltage domain 1010, cells 1002 and 1003 have a second voltage domain 1011, and cell 1004 has a third voltage domain 1012. For ease of reference, the bitmap notation is shown its standard format, wherein each bit indicates voltage domains for the cell as well as its fan-in cell(s). In FIG. 10A, the design has three voltage domains. Therefore, the bitmap has three bits (e.g. the left bit for voltage domain 1010, the middle bit for voltage domain 1011, and the right bit for voltage domain 1012. Note that other designs could have fewer or more voltage domains (a typical state of the art design having 3-5 domains); therefore, the number of bits in the bitmap would vary accordingly.

For example, as shown, cell 1002 is in voltage domain 1011 and therefore, by itself, would have a bitmap of <010>. However, cell 1002 has a fan-in including cell 1001, which is in voltage domain 1010 (and has a bitmap <100>. Therefore, the bitmap of cell 1002 including fan-in information is <110>. The bitmap of cell 1004 takes into account all fan-ins, in this case including cells 1002 and 1001. Therefore, the bitmap of cell 1004 is <111>. Because each voltage domain has a high and low voltage, cells 1001 and 1003 have two voltage corners ($2^1=2$), cell 1002 has four voltage corners ($2^2=4$), and cell 1004 has eight voltage corners ($2^3=8$).

Figure 10B:
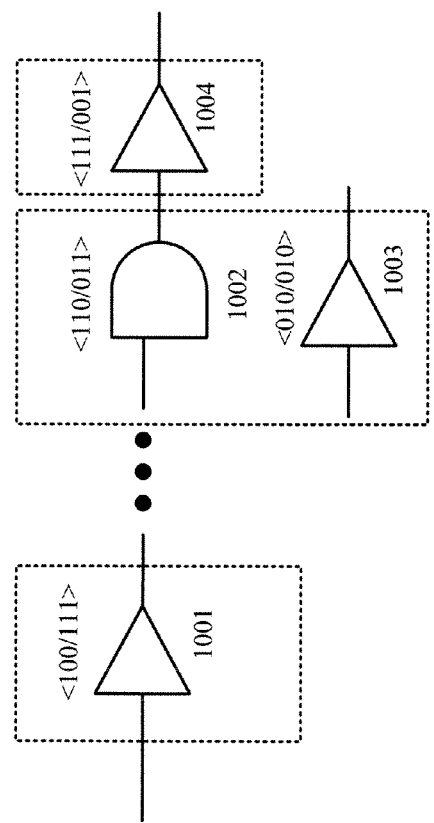
FIG. 10B illustrates exemplary forward bitmaps and backward bitmaps for the design of FIG. 10A.

Although the fan-in cone bitmap can identify the intra-block paths, it is not enough to identify and exclude voltage domains that share a common clock. To do that, another bitmap can be introduced to carry both its voltage domain and that of all of its fan-out cones. FIG. 10B illustrates the design of FIG. 10A (i.e. cells 1001-1004) with exemplary notation for both fan-in and fan-out bitmaps, i.e. fan-in/fan-out bitmaps. After the fan-in bitmaps (also called backward bitmaps) and fan-out bitmaps (called forward bitmaps) for each cell are determined, these bitmaps can be used to identify and exclude voltage domains that are only on the common clock path.

Figure 11A:
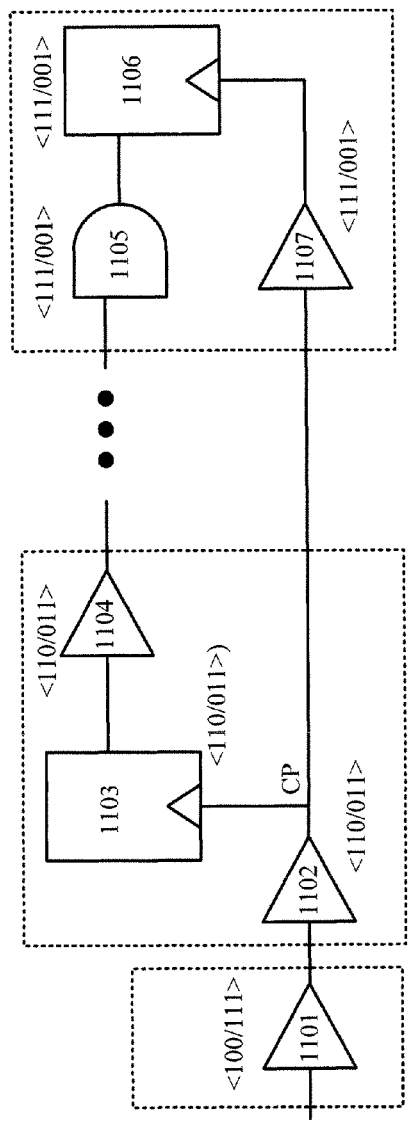
FIGS. 11A and 11B illustrate exemplary designs with bitmaps used to prune the number of possible voltage corners.

Specifically, starting from an end-point cell, the common point (and thus the common point cell) can be found (which should already be available for standard CRPR calculation). Once the common point cell is identified, the forward bitmap of the common point cell and the backward bitmap of the end point cell can be used to calculate the "intersection" (which is a logical AND operation)). FIG. 11A illustrates an exemplary design including cells 1101-1107 in three voltage domains (shown as dotted boxes) and their respective backward and forward bitmaps. In this design the common clock point (CP) is at the output of cell 1102 (the common point cell). The endpoint could be either cell 1105 (the end-point cell) or cell 1107 (end-point clock cell), but in one embodiment is designated as cell 1105 because slack is calculated at the output of an end-point cell. In accordance with the above technique, the forward bitmap of cell 1102, i.e. <011>, and the backward bitmap of cell 1105, i.e. <111>, are added (i.e. a logic AND operation) to obtain the intersection. The resulting bitmap (<011>+<111>=<011>) indicates that the first voltage domain is purely a common clock path. Therefore, for cell 1101 during STA, only "worst" case voltages need to be considered. That is, only its low voltage in late mode and its high voltage in early mode need to be considered. Therefore, this technique can be used to prune the number of possible voltage corner combinations.

Figure 11B:
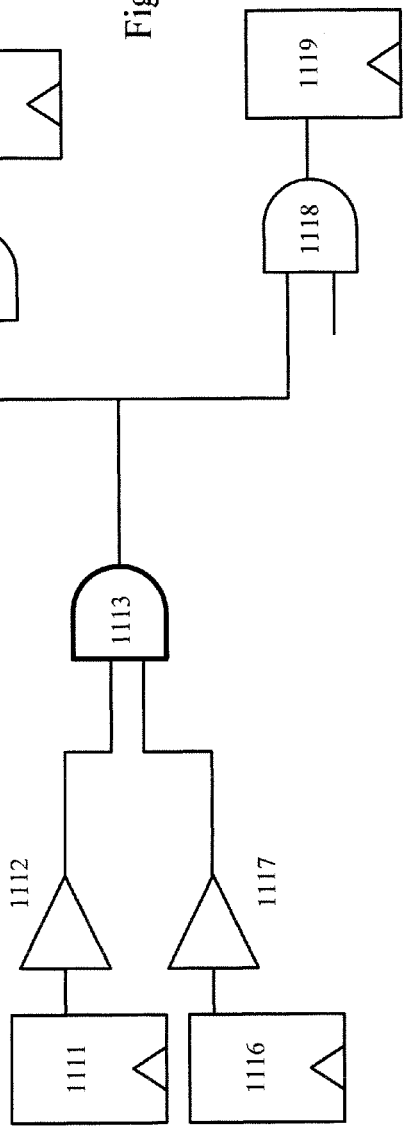

When the intersection bitmaps of all end-points (excluding end-point clock cells) are calculated, these intersection bitmaps can be propagated backward to cover the cells in the data paths. During backward propagation, the union of all fan-out intersections can be determined. Then, the intersection between the combined bitmap and the backward bitmap of the cell can be calculated. For example, FIG. 11B illustrates an exemplary design including cells 1111-1119. Assume the backward bitmaps of cells 1113, 1114, and 1118 are <110>, <001>, and <010>, respectively. The union of the fan-out intersections is a logic OR operation of the backward bitmaps of cells 1114 and 1118, <001> OR <010>=<011>. The intersection between this combined bitmap and the backward bitmap of cell 1113 is a logic AND operation, i.e. <011> AND <110>=<010>. Note that the old bitmap for cell 1113 is <110>; therefore, typically $2^1, 2^1 * 2^0 = 2*2*1 = 4$ voltage corners would need to be considered. By performing the described pruning, the number of voltage corners is reduced from 4 to 2, which is a significant reduction.

As described above, the backward and forward bitmaps can be used to exclude voltage domains that only exist on the common clock path. Notably, the fan-in bitmaps can be used to identify voltage domains that are only on the data paths. Specifically, the fan-in bitmap from the capture clock cell can be backward propagated to detect the non-sharing voltage domains between launch and capture. If cells are in non-sharing voltage domains, then only the worst-case (high voltage for fast and low voltage for slow) voltage configurations need to be considered.

Figure 12:
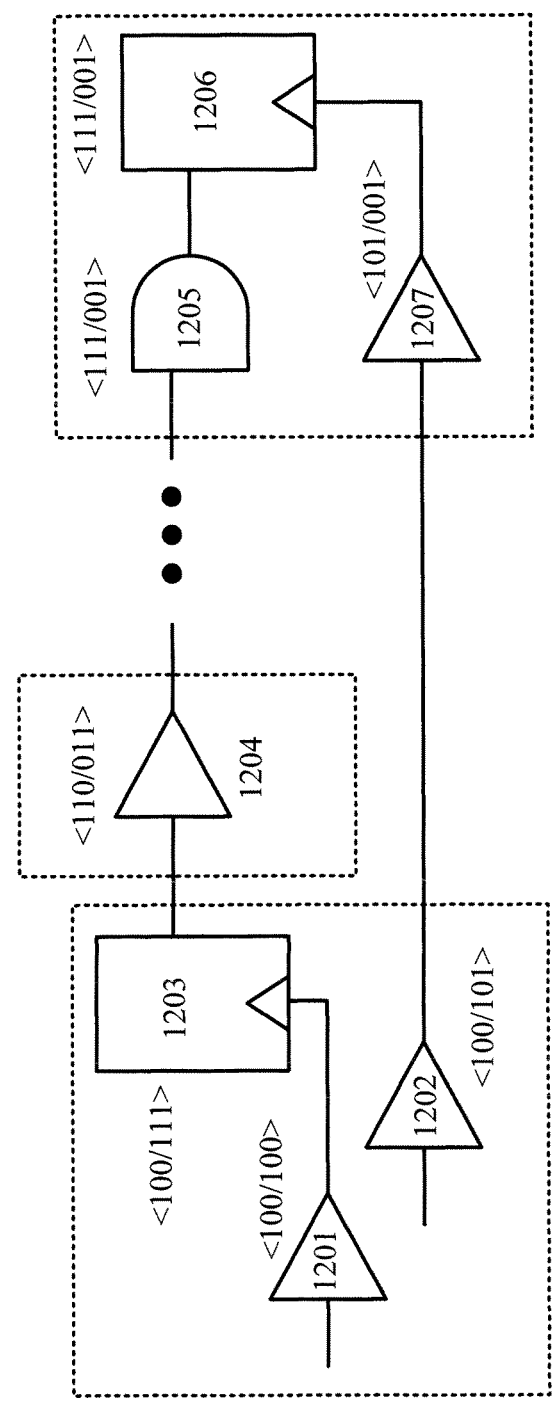
FIG. 12 illustrates how forward bitmaps can be used to detect non-sharing voltage domains between launch and capture paths of a design.

For example, FIG. 12 illustrates an exemplary design including cells 1201-1207, wherein the design has three voltage domains (shown as dotted boxes). The capture clock pin, i.e. cell 1207, has a fan-in bitmap of <101>, which indicates that capture clocks do not cross the second voltage domain (which includes cell 1204). Therefore, for calculating the arrival time that goes through the second voltage domain, only the low voltage for the late mode and the high voltage for the early mode need to be considered.

As described above, the backward and forward bitmaps operate similarly to the backward and forward bounding boxes. The backward and forward bitmaps can be used to identify and remove the voltage domains that only exist on the common-clock paths in graph-based analysis. The backward and forward bitmaps can also identify the launch/capture only voltage domains for further removal of unnecessary voltage process corner combinations. The above-described bitmap techniques, which can be characterized as advanced LOCV technique, can be performed during step 904 (FIG. 9). Note that when the four-corner technique or the dual-box LOCV technique is not performed as well in step 904, then step 903 can be skipped.

Figure 13:
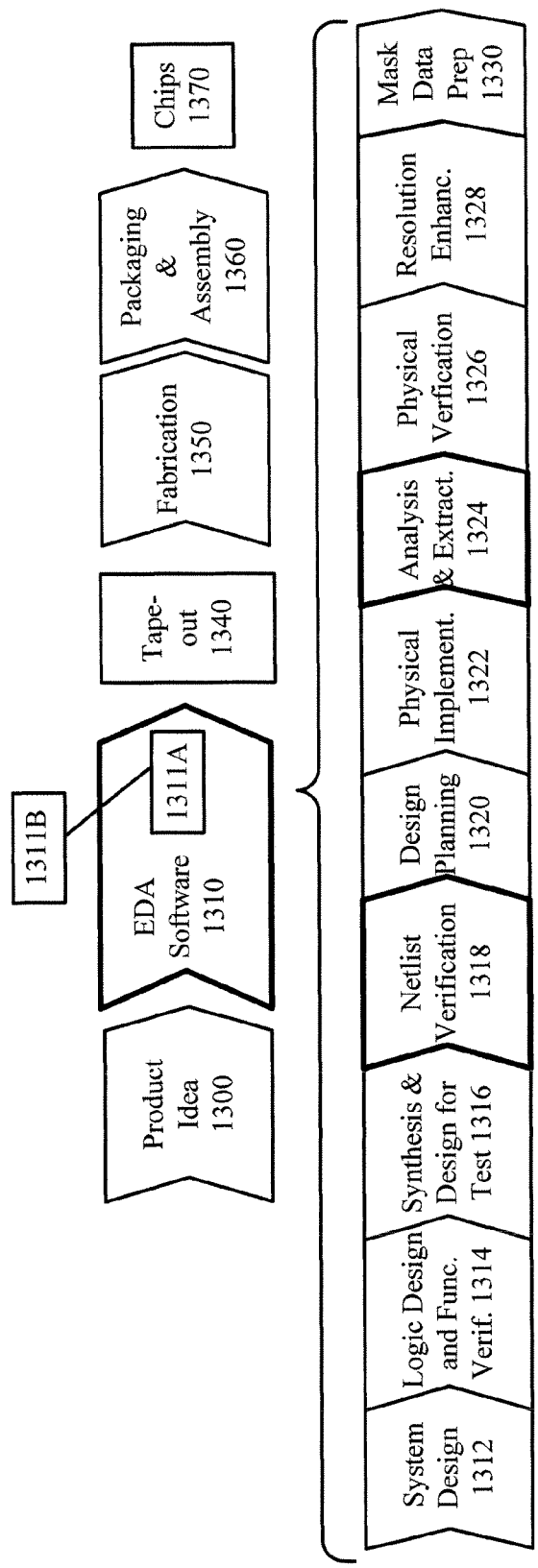
FIG. 13 illustrates a simplified representation of an exemplary digital ASIC design flow including at least one of the advanced LOCV techniques described above.

FIG. 13 shows a simplified representation of an exemplary digital ASIC design flow including at least one of the advanced LOCV techniques described above. At a high level, the process starts with the product idea (step 1300) and is realized in an EDA software design process (step 3010). When the design is finalized, it can be taped-out (event 1340). After tape out, the fabrication process (step 1350) and packaging and assembly processes (step 1360) occur resulting, ultimately, in finished chips (result 1370).

The EDA software design process (step 1310) is actually composed of a number of steps 1312-1330, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components/steps of the EDA software design process (step 1310) will now be provided. In one embodiment, one or more steps of the EDA software design process can be implemented using a computer-readable medium 1011A, which is read by a computer 1311B. Note that Astro, AstroRail, CustomSim, ESP, Hercules, IC Compiler, Magellan, Model Architect, Power Compiler, PrimeRail, Proteus, ProteusAF, PSMGen, Saber, StarRC, and System Studio are trademarks of Synopsys, Inc., and CATS, DesignWare, Design Compiler, Formality, HSIM, Leda, NanoSim, Primetime, Syndicated, TetraMAX, VCS, and Vera are registered trademarks of Synopsys, Inc. System design (step 1312): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect™, Saber™, System Studio™, and DesignWare® products.

Logic design and functional verification (step 1314): At this stage, the VHDL or Verilog code for modules in the system is written and the design is checked for functional accuracy. More specifically, does the design as checked to ensure that produces the correct outputs. Exemplary EDA software products from Synopsys, Inc. that can be used at this step include HSIM®, NanoSim®, CustomSim™, VCS®, VERA®, DesignWare®, Magellan™, Formality®, ESP™ and LEDA® products.

Synthesis and design for test (step 1316): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Power Compiler™, Tetramax®, and DesignWare® products.

Netlist verification (step 1318): At this step, the netlist is checked for compliance with timing constraints and for correspondence with the VHDL/Verilog source code. Exemplary EDA software products from Synopsys, Inc. that can be used at this step include Formality®, PrimeTime™, and VCS° products. In one embodiment, the advanced LOCV model (described in reference to FIGS. 5A, 5B, 6, 7A, 7B, 8, 10A, 10B, 11, 12) can be used during netlist verification to reduce pessimism and/or remove unnecessary process corner combinations.

Design planning (step 1320): Here, an overall floorplan for the chip is constructed and analyzed for timing and top-level routing. Exemplary EDA software products from Synopsys, Inc. that can be used at this step include Astro™ and IC Compiler™ products.

Physical implementation (step 1322): The placement (positioning of circuit elements) and routing (connection of the same) occurs at this step. Exemplary EDA software products from Synopsys, Inc. that can be used at this step include the Astro™ and IC Compiler™ products.

Analysis and extraction (step 1324): At this step, the circuit function is verified at a transistor level, this in turn permits what-if refinement. Exemplary EDA software products from Synopsys, Inc. that can be used at this step include Astro-Rail™, PrimeRail™, Primetime®, and Star RC/XT™ products. In one embodiment, the advanced LOCV model (described in reference to FIGS. 5A, 5B, 6, 7A, 7B, 8, 10A, 10B, 11, 12) can be used during analysis and extraction to reduce pessimism and/or remove unnecessary process corner combinations.

Physical verification (step 1326): At this step various checking functions are performed to ensure correctness for: manufacturing, electrical issues, lithographic issues, and circuitry. Exemplary EDA software products from Synopsys, Inc. that can be used at this step include the Hercules™ product.

Resolution enhancement (step 1328): This step involves geometric manipulations of the layout to improve manufacturability of the design. Exemplary EDA software products from Synopsys, Inc. that can be used at this step include Proteus™, ProteusAF™, and PSMGen™ products.

Mask data preparation (step 1330): This step provides the "tape-out" data for production of masks for lithographic use to produce finished chips. Exemplary EDA software products from Synopsys, Inc. that can be used at this step include the CATS® family of products.

The invention can be implemented advantageously in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language or in assembly or machine language if desired; and in any case, the language can be a compiled or interpreted language. Suitable processors include, by way of example, both general and special purpose microprocessors, as well as other types of microcontrollers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

Although illustrative embodiments of the invention have been described in detail herein with reference to the accompanying figures, it is to be understood that the invention is not limited to those precise embodiments. For example, although distance-based derate is described herein, a similar approach may be used for depth-based derate. Thus, the scope of the invention is defined by the following claims and their equivalents.

The invention claimed is:

1. A method of performing static timing analysis (STA), the method comprising:
    reading a design of an integrated circuit, the design being at least placed;
    determining coordinates of cells of the design;
    reading in a derate table;
    performing dual-box location-based on-chip variation (DBLOCV) analysis, the DBLOCV analysis including:
        forming a backward bounding box and a forward bounding box for a cell;
        calculating a first intermediate maximum distance from the cell to corners of the backward bounding box using the coordinates;
        calculating a second intermediate maximum distance from the cell to corners of the forward bounding box using the coordinates;
    determining a derate value for the cell from the derate table using a maximum distance of the first and second intermediate maximum distances;
    performing the STA using the derate value for the cell; and
    generating at least one timing report based on the STA.

2. The method of claim 1, wherein said calculating the first and the second intermediate maximum distances includes forming a cell box for the cell and adding a distance traversing the cell box to each distance to a corner.

3. The method of claim 1, wherein when the cell is an end-point cell:
    reducing the backward bounding box by overlapping the backward bounding box with a common clock point forward bounding box, wherein an overlap region defines a reduced backward bounding box for the cell,
    wherein the calculating the first intermediate maximum distance is performed using the reduced backward bounding box for the cell.

4. A method of performing dual-box location-based on-chip variation (DBLOCV) analysis, the DBLOCV analysis including:
    forming a backward bounding box and a forward bounding box for a cell of a design;
    calculating a first intermediate maximum distance from the cell to corners of the backward bounding box using coordinates of the design;

calculating a second intermediate maximum distance from the cell to corners of the forward bounding box using the coordinates; and determining a derate value using a maximum distance of the first and second intermediate maximum distances, wherein the method is performed by a computer.

5. The method of claim 4, wherein said calculating the first and the second intermediate maximum distances includes forming a cell box for the cell and adding a distance traversing the cell box to each distance to a corner.

6. The method of claim 4, wherein when the cell is an end-point cell of the design:
reducing the backward bounding box by overlapping the backward bounding box with a common point forward bounding box, wherein an overlap region defines a reduced backward bounding box for the cell,
wherein the calculating the first intermediate maximum distance is performed using the reduced backward bounding box for the cell.

7. A non-transitory, computer-readable medium storing computer-executable instructions for performing static timing analysis (STA), the instructions when executed by a processor cause the processor to execute a process comprising:
reading a design of an integrated circuit, the design being at least placed;
determining coordinates of cells of the design;
reading in a derate table;
performing dual-box location-based on-chip variation (DBLOCV) analysis, the DBLOCV analysis including:
forming a backward bounding box and a forward bounding box for a cell;
calculating a first intermediate maximum distance from the cell to corners of the backward bounding box using the coordinates;
calculating a second intermediate maximum distance from the cell to corners of the forward bounding box using the coordinates;
determining a derate value from the derate table using a maximum distance of the first and second intermediate maximum distances;
performing the STA using the derate value; and
generating at least one timing report based on the STA.

8. The non-transitory, computer-readable medium of claim 7, wherein said calculating the first and the second intermediate maximum distances includes forming a cell box for the cell and adding a distance traversing the cell box to each distance to a corner.

9. The non-transitory, computer-readable medium of claim 7, wherein when the cell is an end-point cell, the process further includes:
reducing the backward bounding box by overlapping the backward bounding box with a common point forward bounding box, wherein an overlap region defines a reduced backward bounding box for the cell, and
wherein said calculating the first intermediate maximum distance is performed using the reduced backward bounding box for the cell.

10. A computer program product comprising an electronic design automation (EDA) program to be executed by a computer, the EDA program for performing a process comprising:
reading a design of an integrated circuit, the design being at least placed;
determining coordinates of cells of the design;
reading in a derate table;
using the computer, performing dual-box location-based on-chip variation (DBLOCV) analysis, the DBLOCV analysis including:
forming a backward bounding box and a forward bounding box for a cell;
calculating a first intermediate maximum distance from the cell to corners of the backward bounding box using the coordinates;
calculating a second intermediate maximum distance from the cell to corners of the forward bounding box using the coordinates;
determining a derate value from the derate table using a maximum distance of the first and second intermediate maximum distances;
performing static timing analysis (STA) using the derate value; and
generating at least one timing report based on the STA.

11. The computer program product of claim 10, wherein said calculating the first and the second intermediate maximum distances includes forming a cell box for the cell and adding a distance traversing the cell box to each distance to a corner.

12. The computer program product of claim 10, wherein when the cell is an end-point cell, the steps further include:
reducing the backward bounding box by overlapping the backward bounding box with a common point forward bounding box, wherein an overlap region defines a reduced backward bounding box for the cell, and
wherein said calculating the first intermediate maximum distance is performed using the reduced backward bounding box for the cell.

13. A method of performing static timing analysis (STA), the method comprising:
reading a design of an integrated circuit, the design being at least placed;
determining coordinates of cells of the design;
reading in a derate table;
performing advanced location-based on-chip variation (ALOCV) analysis, the ALOCV analysis including calculating four distances from a cell to four corners of a bounding box including the cell using the coordinates;
determining a derate value from the derate table using a maximum distance of the four distances;
performing the STA using the derate value; and
generating at least one timing report based on the STA.

14. The method of claim 13, wherein said calculating the four distances includes forming a cell box for the cell and adding a distance traversing the cell box to each of the four distances.

15. A method of performing advanced location-based on-chip variation (ALOCV) analysis, the ALOCV analysis comprising:
calculating four distances from a cell to four corners of a bounding box including the cell, the calculating using coordinates of a design including the cell; and
determining a derate value using a maximum distance of the four distances,
wherein the method is performed using a computer.

16. The method of claim 15, wherein said calculating the four distances includes forming a cell box for the cell and adding a distance traversing the cell box to each of the four distances.

17. A non-transitory, computer-readable medium storing computer-executable instructions for performing static timing analysis (STA), the instructions when executed by a processor cause the processor to execute a process comprising:
reading a design of an integrated circuit, the design being at least placed;
determining coordinates of cells of the design;
reading in a derate table;

performing dual-box location-based on-chip variation (DBLOCV) analysis, the DBLOCV analysis including calculating four distances from a cell to four corners of a bounding box including the cell using the coordinates;

determining a derate value from the derate table using a maximum distance of the four distances;

performing the STA using the derate value; and generating at least one timing report based on the STA.

18. The non-transitory, computer-readable medium of claim 17, wherein said calculating the four distances includes forming a cell box for the cell and adding a distance traversing the cell box to each of the four distances.

19. A computer program product comprising an electronic design automation (EDA) program to be executed by a computer, the EDA program for performing steps comprising:

reading a design of an integrated circuit, the design being at least placed;

determining coordinates of cells of the design;

reading in a derate table;

using the computer, performing dual-box location-based on-chip variation (DBLOCV) analysis, the DBLOCV analysis including calculating four distances from a cell to four corners of a bounding box including the cell using the coordinates;

determining a derate value from the derate table using a maximum distance of the four distances;

performing static timing analysis (STA) using the derate value; and generating at least one timing report based on the STA.

20. The computer program product of claim 19, wherein said calculating the four distances includes forming a cell box for the cell and adding a distance traversing the cell box to each of the four distances.

21. A method of performing static timing analysis (STA), the method comprising:

reading a design of an integrated circuit;

determining voltage domains of cells of the design;

performing multiple voltage domain analysis, the multiple voltage domain analysis including generating forward bitmaps and backward bitmaps for a plurality of cells of the design;

from an end-point cell of the design, identifying a common point cell, the plurality of cells including the end-point cell and the common point cell;

calculating an intersection of a forward bitmap of the common point cell and a backward bitmap of the end-point cell;

identifying any voltage domain that is not on a common clock path based on the intersection, the identifying generating at least two identified voltage domains;

performing the STA with the multiple voltage domain analysis based on the at least two identified voltage domains; and generating at least one timing report based on the STA.

22. A non-transitory, computer-readable medium storing computer-executable instructions for performing static timing analysis (STA), the instructions when executed by a processor cause the processor to execute a process comprising:

reading a design of an integrated circuit;

determining voltage domains of cells of the design;

performing multiple voltage domain analysis, the multiple voltage domain analysis including generating forward bitmaps and backward bitmaps for a plurality of cells of the design;

from an end-point cell of the design, identifying a common point cell, the plurality of cells including the end-point cell and the common point cell;

calculating an intersection of a forward bitmap of the common point cell and a backward bitmap of the end-point cell;

identifying any voltage domain that is not on a common clock path based on the intersection, the identifying generating at least two identified voltage domains;

performing the STA with the multiple voltage domain analysis based on the at least two identified voltage domains; and generating at least one timing report based on the STA.

23. A computer program product comprising an electronic design automation (EDA) program, the EDA program for performing a process comprising:

reading a design of an integrated circuit;

determining voltage domains of the design;

performing multiple voltage domain analysis, the multiple voltage domain analysis including generating forward bitmaps and backward bitmaps for a plurality of cells of the design;

from an end-point cell of the design, identifying a common point cell, the plurality of cells including the end-point cell and the common point cell;

calculating an intersection of a forward bitmap of the common point cell and a backward bitmap of the end-point cell;

identifying any voltage domain that is not on a common clock path based on the intersection, the identifying generating at least two identified voltage domains;

performing the STA with the multiple voltage domain analysis based on the at least two identified voltage domains; and generating at least one timing report based on the STA.

* * * * *